United States Patent
Brown

(10) Patent No.: US 10,701,287 B1
(45) Date of Patent: Jun. 30, 2020

(54) PASSIVE CLEAR AIR TURBULENCE DETECTION SYSTEM AND METHOD

(71) Applicant: Robert G. Brown, Tustin, CA (US)

(72) Inventor: Robert G. Brown, Tustin, CA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 681 days.

(21) Appl. No.: 13/901,253

(22) Filed: May 23, 2013

(51) Int. Cl.
| | |
|---|---|
| *G01M 3/00* | (2006.01) |
| *H04N 7/18* | (2006.01) |
| *H04N 5/33* | (2006.01) |
| *G06K 9/46* | (2006.01) |
| *G01N 21/53* | (2006.01) |
| *G01W 1/02* | (2006.01) |
| *F03D 7/04* | (2006.01) |

(52) U.S. Cl.
CPC ............ *H04N 5/33* (2013.01); *G01N 21/538* (2013.01); *F03D 7/048* (2013.01); *G01W 1/02* (2013.01)

(58) Field of Classification Search
CPC ....... F03D 7/048; G01N 21/538; G01W 1/02; H04N 5/33
USPC ...................................................... 250/338.1
See application file for complete search history.

(56) References Cited

U.S. PATENT DOCUMENTS

| | | | | | |
|---|---|---|---|---|---|
| 3,475,963 A | * | 11/1969 | Astheimer | ............... | G01W 1/00 374/123 |
| 3,641,345 A | * | 2/1972 | Coackley | ............... | G01J 5/0014 250/347 |
| 3,780,293 A | * | 12/1973 | Flint | ............... | G01J 5/0014 250/339.03 |
| 3,856,402 A | * | 12/1974 | Low | ............... | G01S 7/06 356/5.06 |
| 4,266,130 A | * | 5/1981 | Kuhn | ............... | G01J 5/602 250/338.5 |
| 4,363,967 A | * | 12/1982 | Efkeman | ............... | G01J 5/0014 250/338.5 |

(Continued)

FOREIGN PATENT DOCUMENTS

| | | |
|---|---|---|
| RU | 2374720 C1 | 11/2009 |
| RU | 101866 U1 | 1/2011 |

(Continued)

OTHER PUBLICATIONS

Author: Aviv Ofir et al., Title: Offline, multidetector intensity interferometers—I. Theory, Date: Dec. 2006, Publisher: Mon. Not. R. Astron. Soc. 368, 1646-1651 (2006).*

(Continued)

*Primary Examiner* — Taeho Jo
(74) *Attorney, Agent, or Firm* — Donna P. Suchy

(57) ABSTRACT

A passive thermal imaging system is described. The system includes at least one detector array configured to detect thermal electromagnetic radiation (EMR), imaging optics, and processing electronics. The imaging optics are configured to receive thermal EMR from an object, and to image the received thermal EMR onto pixels of each of the at least one detector array. The processing electronics are configured to receive a detected signal from each of the pixels of the at least one detector array, to calculate a correlation value based on a correlation between the received detected signals from the pixels, and to compare the correlation value with a threshold correlation value to determine whether a detection event has occurred.

12 Claims, 4 Drawing Sheets

(56) References Cited

U.S. PATENT DOCUMENTS

| | | | | |
|---|---|---|---|---|
| 4,794,395 | A * | 12/1988 | Cindrich | G01K 11/006 342/25 C |
| 4,937,447 | A * | 6/1990 | Barrett | G01J 5/0014 250/338.1 |
| 5,602,543 | A * | 2/1997 | Prata | G01J 5/60 250/338.5 |
| 5,721,431 | A * | 2/1998 | Hersom | B64G 1/22 250/340 |
| 5,777,736 | A * | 7/1998 | Horton | G01J 3/453 356/456 |
| 5,949,071 | A | 9/1999 | Ruffner et al. | |
| 5,974,875 | A * | 11/1999 | Leslie | G01S 11/02 73/170.07 |
| 6,018,587 | A * | 1/2000 | Cabib | G01J 3/12 382/165 |
| 6,144,366 | A * | 11/2000 | Numazaki | G06F 3/011 345/156 |
| 6,184,816 | B1 * | 2/2001 | Zheng | G01S 7/003 342/26 R |
| 6,237,405 | B1 * | 5/2001 | Leslie | G01J 5/0014 73/170.07 |
| 6,307,500 | B1 * | 10/2001 | Cornman | G01S 13/58 342/26 R |
| 6,409,198 | B1 * | 6/2002 | Weimer | G01J 5/52 250/339.01 |
| 6,456,226 | B1 * | 9/2002 | Zheng | G01S 7/003 342/26 R |
| 6,515,285 | B1 * | 2/2003 | Marshall | G01J 5/20 250/339.03 |
| 6,563,452 | B1 * | 5/2003 | Zheng | G01S 7/003 342/26 R |
| 6,710,345 | B2 * | 3/2004 | Carter | G08B 17/12 250/338.5 |
| 6,992,292 | B2 * | 1/2006 | Cross | G08B 13/19602 250/332 |
| 7,718,975 | B2 * | 5/2010 | Hyde | G01J 1/4228 250/394 |
| 7,956,328 | B2 * | 6/2011 | Sundaram | G01N 21/552 250/339.11 |
| 8,089,115 | B2 | 1/2012 | Leong et al. | |
| 8,154,724 | B2 * | 4/2012 | Mitchell | G01N 15/1459 356/343 |
| 8,492,727 | B1 | 7/2013 | Brown et al. | |
| 8,772,729 | B1 * | 7/2014 | Brown | B82Y 30/00 250/370.07 |
| 8,834,020 | B2 * | 9/2014 | Abreu | A61B 5/0008 374/121 |
| 8,866,322 | B2 * | 10/2014 | Tchoryk, Jr. | G01S 17/89 290/44 |
| 8,902,100 | B1 * | 12/2014 | Woodell | G01S 7/04 342/26 B |
| 9,294,690 | B1 * | 3/2016 | Caulfield | H04N 5/33 |
| 2002/0100874 | A1 * | 8/2002 | Carter | G08B 17/12 250/338.5 |
| 2002/0168116 | A1 * | 11/2002 | Takayama | H04N 1/40056 382/275 |
| 2003/0009268 | A1 * | 1/2003 | Inokuchi | G01S 17/58 701/14 |
| 2003/0219150 | A1 * | 11/2003 | Niles | G06K 9/00 382/128 |
| 2003/0226967 | A1 * | 12/2003 | Cross | G08B 13/19602 250/332 |
| 2004/0096125 | A1 * | 5/2004 | Alderson | H04N 5/367 382/312 |
| 2004/0100395 | A1 * | 5/2004 | Anderson | G01P 5/001 340/945 |
| 2005/0045825 | A1 * | 3/2005 | Murata | G01S 17/46 250/342 |
| 2005/0069207 | A1 * | 3/2005 | Zakrzewski | B64D 45/0015 382/190 |
| 2006/0121893 | A1 * | 6/2006 | Tillotson | G01P 5/001 455/431 |
| 2008/0180691 | A1 * | 7/2008 | Hays | G01N 21/47 356/519 |
| 2008/0251723 | A1 * | 10/2008 | Ward | G01J 5/02 250/338.4 |
| 2008/0277566 | A1 * | 11/2008 | Utagawa | G02B 7/34 250/208.1 |
| 2009/0028451 | A1 * | 1/2009 | Slinger | G01T 1/295 382/233 |
| 2009/0244536 | A1 * | 10/2009 | Mitchell | G01N 15/1459 356/343 |
| 2010/0025585 | A1 * | 2/2010 | Taguchi | A61B 5/0059 250/339.13 |
| 2010/0058978 | A1 | 3/2010 | Nikoobakht | |
| 2010/0091134 | A1 * | 4/2010 | Cooke | H04N 5/232 348/229.1 |
| 2010/0102232 | A1 * | 4/2010 | Tolton | G01J 3/457 250/339.07 |
| 2010/0124053 | A1 | 5/2010 | Wu et al. | |
| 2010/0127172 | A1 | 5/2010 | Nikoobakht | |
| 2010/0258708 | A1 * | 10/2010 | Meyers | G01S 17/36 250/208.1 |
| 2011/0013016 | A1 * | 1/2011 | Tillotson | G01N 21/41 348/135 |
| 2011/0108717 | A1 * | 5/2011 | Olson | H01L 27/14649 250/252.1 |
| 2011/0164783 | A1 * | 7/2011 | Hays | G01S 17/58 382/100 |
| 2011/0215936 | A1 * | 9/2011 | Ansari | G01M 3/002 340/584 |
| 2012/0101747 | A1 * | 4/2012 | Kielkopf | G01M 3/002 702/51 |
| 2012/0274937 | A1 * | 11/2012 | Hays | G01S 17/58 356/337 |
| 2012/0327287 | A1 * | 12/2012 | Meyers | G01B 11/24 348/335 |
| 2013/0038741 | A1 * | 2/2013 | Kovalchuk | G01J 3/2823 348/197 |
| 2013/0075699 | A1 * | 3/2013 | Brown | B82Y 30/00 257/21 |
| 2013/0235178 | A1 * | 9/2013 | Wang | H04N 5/33 348/77 |
| 2013/0235901 | A1 * | 9/2013 | Shin | H01J 5/0025 374/121 |
| 2013/0314694 | A1 * | 11/2013 | Tchoryk, Jr. | G01S 17/95 356/28.5 |
| 2013/0321637 | A1 * | 12/2013 | Frank | H04N 5/33 348/152 |
| 2014/0085449 | A1 * | 3/2014 | Mandelis | A61B 5/0073 348/77 |
| 2014/0099043 | A1 * | 4/2014 | Enderlein | G02B 21/367 382/278 |

FOREIGN PATENT DOCUMENTS

| | | |
|---|---|---|
| WO | WO-2008/135905 | 11/2008 |
| WO | WO-2009/104188 | 8/2009 |

OTHER PUBLICATIONS

Anderson, Surface Enhanced Infrared Absorption by Coupling Photon and Plasmon Resonance, Applied Physics Letters, 2005, 4 pages.

Campbell, Optoelectronic Technology and Lightwave Communication Systems, Van Nostrand Reinhold, 1989, 40 pages.

International Search Report and Written Opinion for Application No. PCT/US12/35112, dated Jun. 28, 2012, 5 pages.

Knight et al., Photodetection with Active Optical Antennas, May 6, 2011, 5 pages.

McIntyre, Recent Developments in Silicon Avalanche Photodiodes, 1985, 7 pages.

McIntyre, The Distribution of Gains in Uniformly Multiplying Avalanche Photodiodes: Theory, IEEE Transactions on Electron Devices, Jun. 1972, 11 pages.

(56) References Cited

OTHER PUBLICATIONS

Miyachi et al., A Photosensing System Composed of Photosystem I, Molecular Wire, Gold Nano-Particle, and Double Surfactants in Water, 2010, 3 pages.
Radford et al., Sensitivity Improvements in Uncooled Microbolometer FPAs, Proc. SPIE, 1999, 12 pages.
Rogalski, Selected Papers on Infrared Detectors: Developments, 2004.
Saleh et al., Fundamentals of Photonics, 1991, 4 pages.
Sonnichsen et al., Drastic Reduction of Plasmon Damping in Gold Nanorods, Phys. Rev. Letts., 2002, 4 pages.
Wokaun, Surface Enhancements of Optical Fields, Molecular Physics, 1985, 34 pages.
Yamaguchi et al., Optical Effect of the Substrate on the Anomalous Absorption of Aggregated Silver Films, Thin Solid Films, 1974, 15 pages.
Zayats et al., Nano-Optics of Surface Plasmon Polaritons, Physics Reports 408, 2005, 184 pages.
Zhao et al., The Extinction Spectra of Silver Nanoparticle Arrays: Influence of Array Structure on Plasmon Resonance Wavelength and Width, J. Phys. Chem. B, 2003, 8 pages.

\* cited by examiner $$\text{SIGMAT} = \begin{bmatrix} L & L & L & 0 & L & L & 0 & 0 & 0 & L \\ L & 0 & L & L & L & L & 0 & 0 & 0 & 0 \\ L & 0 & 0 & L & L & L & 0 & L & 0 & 0 \\ L & L & L & L & L & L & 0 & 0 & 0 & 0 \\ 0 & 0 & 0 & 0 & 0 & 0 & L & 0 & 0 \\ 0 & 0 & L & 0 & 0 & L & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \end{bmatrix}$$

FIG. 5

NOISEMAT1 =

|   | 0 | 1 | 2 | 3 | 4 |
|---|---|---|---|---|---|
| 0 | $1.268*10^{-3}$ | 0.193 | .585 | 0.35 | 0.823 |
| 1 | 0.989 | 0.119 | $8.923*10^{-3}$ | 0.532 | 0.602 |
| 2 | 0.876 | 0.956 | 0.539 | 0.462 | 0.862 |
| 3 | 0.376 | 0.677 | $8.817*10^{-3}$ | 0.276 | 0.588 |
| 4 | 0.599 | 0.735 | 0.572 | 0.152 | 0.425 |
| 5 | 0.148 | 0.142 | 0.693 | 0.427 | 0.967 |
| 6 | 0.732 | 0.28 | 0.682 | 0.722 | 0.123 |
| 7 | 0.472 | 0.847 | 0.456 | 0.983 | 0.739 |
| 8 | 0.531 | 0.843 | 0.658 | 0.842 | 0.11 |
| 9 | 0.253 | $1.619*10^{-3}$ | 0.806 | 0.211 | ... |

FIG. 6

SIGNOISEMAT1 =

|   | 0 | 1 | 2 | 3 | 4 |
|---|---|---|---|---|---|
| 0 | 1.001 | 1.193 | 1.585 | 0.35 | 1.823 |
| 1 | 1.989 | 0.119 | 1.009 | 1.532 | 1.602 |
| 2 | 1.876 | 0.956 | 0.539 | 1.462 | 1.862 |
| 3 | 1.376 | 1.677 | 1.009 | 1.276 | 1.588 |
| 4 | 0.599 | 0.735 | 0.572 | 0.152 | 0.425 |
| 5 | 0.148 | 0.142 | 0.693 | 0.427 | 0.967 |
| 6 | 0.732 | 0.28 | 0.682 | 0.722 | 0.123 |
| 7 | 0.472 | 0.847 | 0.456 | 0.983 | 0.739 |
| 8 | 0.531 | 0.843 | 0.658 | 0.842 | 0.11 |
| 9 | 0.253 | $1.619*10^{-3}$ | 0.806 | 0.211 | ... |

FIG. 7

PASSIVE CLEAR AIR TURBULENCE DETECTION SYSTEM AND METHOD

BACKGROUND OF THE INVENTION

Clear air turbulence (CAT) is the turbulent movement of air masses in the absence of any visual cues such as clouds, and is caused when bodies of air moving at widely different speeds meet. The atmospheric region most susceptible to CAT is the high troposphere at altitudes of around 7,000-12,000 meters (23,000-39,000 ft) as it meets the tropopause. Here CAT is most frequently encountered in the regions of jet streams. At lower altitudes it may also occur near mountain ranges. Thin cirrus clouds can also indicate a high probability of CAT.

CAT can be hazardous to the comfort, and even safety, of air travel. The thermal characteristics of CAT are known. Studies show that gust velocity changes in CAT of at least 20 ft sec$^{-1}$ are associated with temperature changes of 3° C. or higher; very few being less than 1° C. Such studies show that CAT horizontal temperature gradients with a minimum temperature change of 2° C., and at a rate which equaled or exceeded 0.5° C. per minute. Moderately choppy CAT was observed at a 5° C. temperature change.

Conventionally, CAT has been measured using active electro-optical heterodyne laser velocimeter systems at ranges exceeding 10 km. Such active systems typically use 10 micron wavelength LWIR (long wavelength infrared) $CO_2$ lasers, larger germanium optics and heterodyning optics. Fast, complex signal and data processing renders systems constructed along these lines are expensive, power-hungry, heavy, and physically large. Further such active systems require much maintenance on a use-by-use basis in alignment, cleaning etc.

SUMMARY OF THE INVENTION

According to one embodiment, there is provided a passive thermal imaging system, comprising: at least one detector array configured to detect thermal electromagnetic radiation (EMR); imaging optics configured to receive thermal EMR from an object, and to image the received thermal EMR onto pixels of each of the at least one detector array; and processing electronics configured to receive a detected signal from each of the pixels of the at least one detector array, to calculate a correlation value based on a correlation between the received detected signals from the pixels, and to compare the correlation value with a threshold correlation value to determine whether a detection event has occurred.

According to one aspect of the embodiment, the at least one detector array comprises a single detector array, and the processing electronics is configured to calculate a correlation value based on auto-correlation of the pixels of the single detector array.

According to another aspect of the embodiment, the at least one detector array comprises a plurality of detector arrays, and the processing electronics is configured to calculate a correlation value based on multi-correlation of corresponding pixels of the plurality of detector arrays.

According to another aspect of the embodiment, the plurality of detector arrays comprises two detector arrays, and the processing electronics is configured to calculate a correlation value based on cross-correlation of corresponding pixels of the plurality of detector arrays.

According to another aspect of the embodiment, the plurality of detector arrays comprises three detector arrays, and the processing electronics is configured to calculate a correlation value based on triple-correlation of corresponding pixels of the plurality of detector arrays.

According to another aspect of the embodiment, the at least one detector array comprises at least one of a nanoparticle plasmonic detector array, a mercury cadmium telluride detection array, or a bolometer detector array.

According to another aspect of the embodiment, the at least one detector array comprises a nanoparticle plasmonic detector array.

According to another aspect of the embodiment, the imaging optics are configured to receive thermal EMR from a region of the atmosphere as the object, and where the detection event is clear air turbulence.

According to another aspect of the embodiment, the processing electronics is configured to time integrate or spatially integrate the detected signals at a rate of 1 to 10 times per second.

According to another aspect of the embodiment, the imaging optics comprises an imaging lens.

According to another aspect of the embodiment, the passive thermal imaging system further comprises a bandpass filter which filters the received thermal EMR from the object within a EMR wavelength range.

According to another aspect of the embodiment, a system for detecting clear air turbulence, comprises: a structure having the passive thermal imaging system mounted thereon.

According to another aspect of the embodiment, the structure is one of a vehicle or a ground-based platform.

According to another aspect of the embodiment, the structure is a vehicle, which is one of an aircraft, a spacecraft, or an unmanned aerial vehicle.

BRIEF DESCRIPTION OF THE DRAWINGS

FIG. 5 illustrates a randomly populated signal matrix.

FIG. 6 illustrates a noise matrix.

FIG. 7 illustrates a signal plus noise matrix.

DETAILED DESCRIPTION OF THE PREFERRED EMBODIMENTS

According to certain embodiments of the present invention, a passive optical system which may discriminate a minimum change of 2° C. from an imaged region and its background, and thus is appropriate for detecting CAT is described. The passive system uses correlation techniques to reduce the effects of thermal background noise to allow for detection of CAT at a distance from the system of >10 km. Such a detection distance of CAT provides a warning time of about 30 seconds for an optical system on an aircraft traveling at about 600 miles/hr. Such a small temperature change may be determined in the presence of certain natural background radiation from the day time and night time sky, although not necessarily in the presence of all strengths of natural background radiation.

Figure 1:
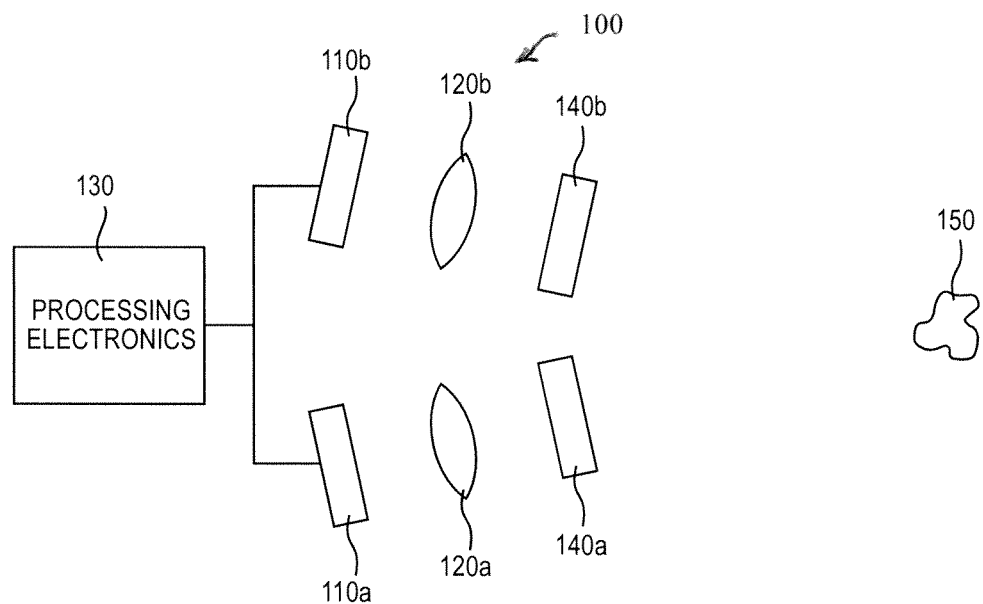
FIG. 1 is a schematic illustrating a passive thermal imaging system according to an embodiment of the invention.

FIG. 1 illustrates a passive thermal imaging system 100 according to an embodiment of the invention. The system 100 includes at least one detector array 110, (110a and 110b in FIG. 1), imaging optics 120 (imaging optics components 120a and 120b in FIG. 1), and processing electronics 130. The imaging optics 120 images an object of interest 150 onto the at least one detector array 110. While FIG. 1 illustrates the at least detector array 110 to be two detector arrays 110a and 110b, the at least one detector array 110 may be a single detector array, or more than two detector arrays, such as three detector arrays. Likewise, while FIG. 1 illustrates the imaging optics to be two imaging optics components 120a and 120b, the imaging optics 120 may be a single imaging optics component, or more than two imaging optics components, such as three imaging optics components. In general, the imaging optics components 120a and 120b image thermal electromagnetic radiation (EMR) from an object 150 of interest onto detector arrays 110a and 110b, respectively.

Figure 2:
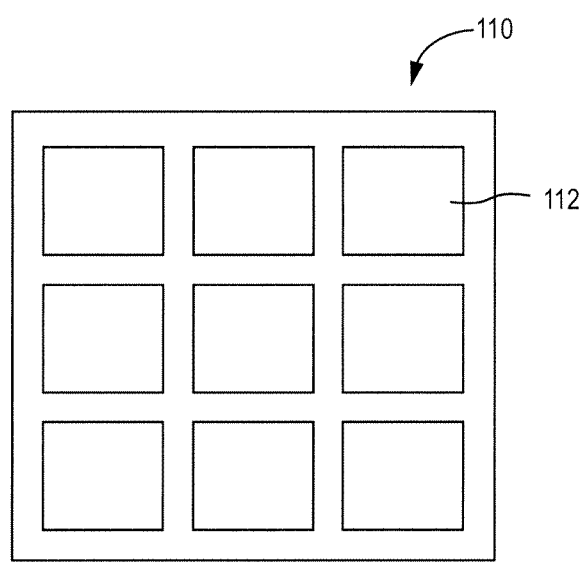
FIG. 2 is a schematic illustrating a view of a detector array including an array of pixels according to an embodiment of the invention.

FIG. 2 illustrates a view of a detector array 110 including an array of pixels 112. While FIG. 2 illustrates a 3×3 array of pixels for ease of illustration, in general, the size of the array of pixels will be much larger than 3×3. The detector material for the pixels 112 may be any material appropriate for detecting thermal EMR at an appropriate wavelength. In this regard, the detector array 110 may comprise at least one of a nanoparticle plasmonic detector array, a mercury cadmium telluride detection array, or a bolometer detector array. Nanoparticle plasmonic detector arrays are described in, for example, U.S. patent application Ser. No. 13/243,342 entitled NANO-STRUCTURE ARRAYS FOR EMR IMAGING, filed Sep. 23, 2011, which is incorporated by reference in its entirely herein.

Referring back to FIG. 1, the system 100 may include at least one bandpass filter 140 (filters 140a and 140b in FIG. 1) which filters the received thermal EMR from the object 150 within a EMR wavelength range of interest. For example, for a EMR wavelength of interest of 10 microns, the bandpass filter 140 may pass EMR in a wavelength range of 10 microns±2 microns.

The imaging optics 120 images the EMR from the object at a desired wavelength of interest. For example, for a EMR wavelength of interest of 10 microns, the imaging optics may comprise a lens, or lenses, made of germanium to image the thermal EMR from the object 150.

The imaging system 100 may be of appropriate dimensions for imaging thermal EMR from an object at an appropriate distance. For example, if the system 100 is intended to image thermal EMR from an object at a distance of about 10 km from the system 100, the system may be an f/5 system, for example, where the imaging optics 120 has a focal length of about 0.5 meters, for example, and a lens diameter of about 10 cm, for example.

The processing electronics 130 receives a detected signal from each of the pixels 112 of the at least one detector array 110. The processing electronics 130 further calculates a correlation value based on a correlation between the received detected signals from the pixels 112, and compares the correlation value with a threshold correlation value to determine whether a detection event has occurred.

Below is provided a background discussion for determining the signal to noise and event detection capability of the system 100, where the event is detection of CAT.

Basic Optical Principles for System and Signal Strength

For an extended source that fills the field of view of a detector, the detector irradiance H is related to the source radiance, N, by the following radiometric equation, where trans is the transmission of the atmosphere and system optics, m is the system magnification, v/u, and $FN_0$ is the f/# of the system:

$$H := \pi \cdot N \cdot \frac{\text{trans}}{4 \cdot FNo^2 \cdot (m+1)^2}$$

For a 273° K object temperature, the spectral radiance of the extended body, where emissivity is assumed to be equal to unity, is ~8 Watts per square meter, steradian, micron. For the above 0.5 m, f/5 lens, operated with an 8-12 micron bandpass filter, and with 50% atmospheric and optical transmission efficiency overall, the detector irradiance H is calculated to be ~0.5 Watts per square meter.

For a 10 micron square nanoparticle plasmonic detector array operated in the LWIR region of 8-12 microns, where such a nanoparticle plasmonic detector array is described in, for example, U.S. patent application Ser. No. 13/243,342 entitled NANO-STRUCTURE ARRAYS FOR EMR IMAGING, filed Sep. 23, 2011, which is incorporated by referenced in its entirely herein, the maximum Responsivity may be estimated to be about 5000 Amps/Watt, with a RMS Noise performance at 2 pico-Amps. Presuming a Responsivity in practice to be about 500 Amps/Watt, the signal to noise ratio in such a nanoparticle plasmonic pixel would be $~1.4 \times 10^4$, and at least 1,000 even if the detector noise was 10× greater. Alternatively, a typical MCT detector of a 15 micron pixel side cooled to 77° K would yield a signal to noise ratio of ~40, and an un-cooled typical microbolometer of a 17 micron pixel side would yield a signal to noise ratio of ~9.5.

From a system performance point of view, of concern is the measurement of the difference in temperature of the target object from its adjacent background, which should be about 2° C. for CAT detection. In measuring such a 2° C. temperature difference, the Minimum Resolvable Temperature Difference (MRTD) and Minimum Detectable Temperature Difference (MDTD) are the parameters of importance as is known in thermal imaging. To determine the MRTD, NDTD, as well as Noise Equivalent Temperature Difference (NETD), standard equations may be used as in known [Lloyd, J. M., 1975; 'Thermal Imaging Systems', Plenum Press].

In calculating the MRTD and MDTD, a dwell time of 0.2 seconds is presumed. The NETD for the three detectors under consideration noted above is determined to be ~11 milliKelvin for a nanoparticle plasmonic detector, ~96 milliKelvin for a typical MCT detector, and ~980 milliKelvin for a typical microbolometer detector.

The MDTD may be calculated for a 1 kHz bandwidth system, which provides for the three detectors under consideration noted above as follows: ~4.6 milliKelvin for a nanoparticle plasmonic detector, ~24 milliKelvin for a typical MCT detector, and ~300 milliKelvin for a typical microbolometer detector.

Thus, without accounting for natural background radiation, all three LWIR detectors noted can measure the necessary temperature difference required for CAT detection.

Background Radiation, Atmospheric Transmission, Turbulence Effects

In practice, however, the natural background radiation, atmospheric transmission and turbulence effects must be taken into account in determining whether or not CAT may be detected. The ability to discriminate against background noise contributions and fluctuations is of critical importance to effective realization in practice of the concept of passive CAT discrimination and reliable measurement.

Background noise can enter an optical system for detection of CAT from a wide range of circumstances, such as looking at the sun, the moon as the background, looking at clouds, or the day or night sky, or even at the Earth itself. For the purposes of performance calculations, the magnitude of the different background noise contributions that might be encountered by a CAT system in practice must be considered, where such contributions may come from the, sun, the daytime sky, the full moon, the earth, or the brightest stars.

Further, atmospheric transmission must be taken into account in determining whether or not CAT may be detected. The transmittance of the atmosphere at an EMR wavelength of 10 microns is of concern for the system described above. The overall transmissivity of the atmosphere, per km, is about 80% per km for a wavelength region of 10 microns.

The turbulence of interest is associated with small thermal fluctuations, which along a 10 km path length, may have an appreciable effect on the integrity of the image. In order to estimate the effect of turbulence on the image, information on the thermal fluctuations likely at 10 micron EMR wavelength is needed. The effect of turbulence can be explained with respect to FIGS. 3A, 3B and 4.

Figure 3A:
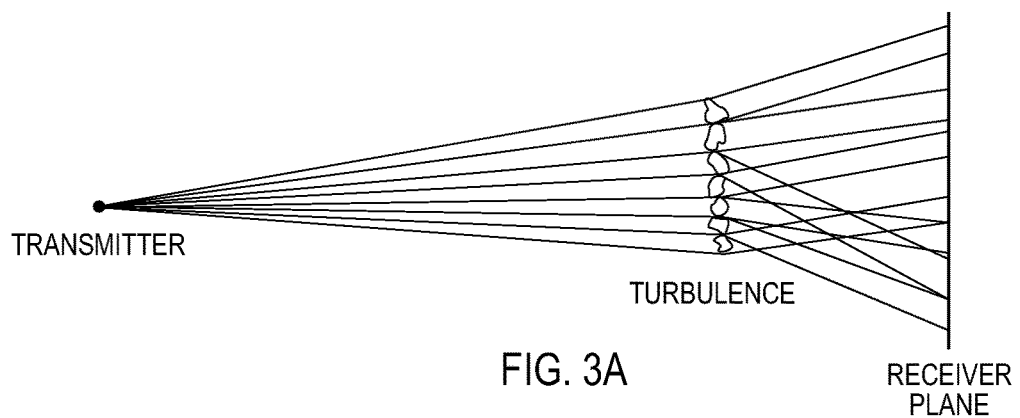
FIGS. 3A and 3B illustrate the effect of turbulence on EMR radiation received from a region of interest and impinging on a receiver plane.
Figure 3B:
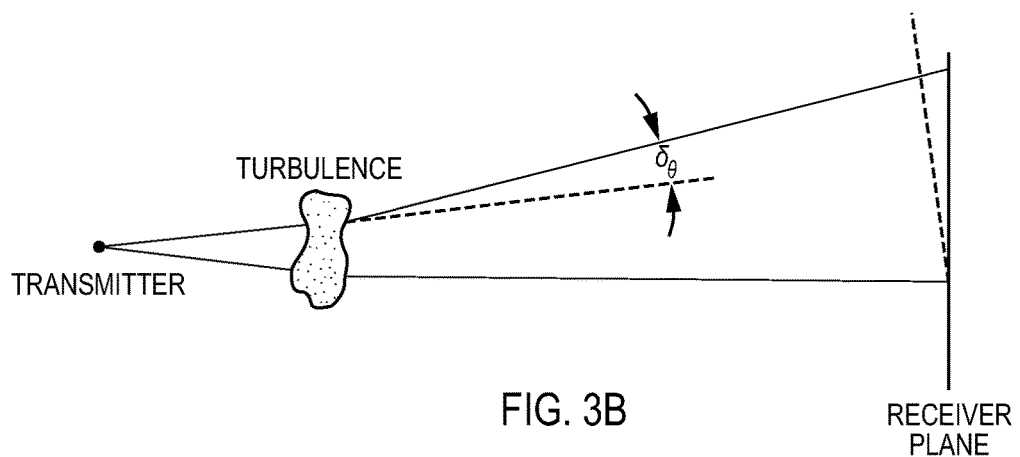

FIGS. 3A and 3B illustrate the effect of turbulence on EMR radiation received from a region of interest located at the point "Transmitter" and impinging on a receiver plane. The turbulence will cause fluctuation in the index of refraction of the air, thus affecting the imaging onto the image plane. The effect of atmospheric turbulence depends on the relative sizes of the beam diameter, $d_B$, and the size of the fluctuation, 1. FIG. 3A illustrates the case where the size of the fluctuation 1 is much less than the beam diameter $d_B$ of the radiation from the point "Transmitter," while FIG. 3B illustrates the case where the size of the fluctuation 1 is much greater than the beam diameter $d_B$ of the radiation from the point "Transmitter." As seen in FIGS. 3A and 3B, if $d_B/1 \ll 1$, the major effect of turbulence is to deflect the imaging-beam as a whole. If $d_B/1 \ll 1$, small portions of the beam are diffracted and the imaging beam can become badly distorted.

Figure 4:
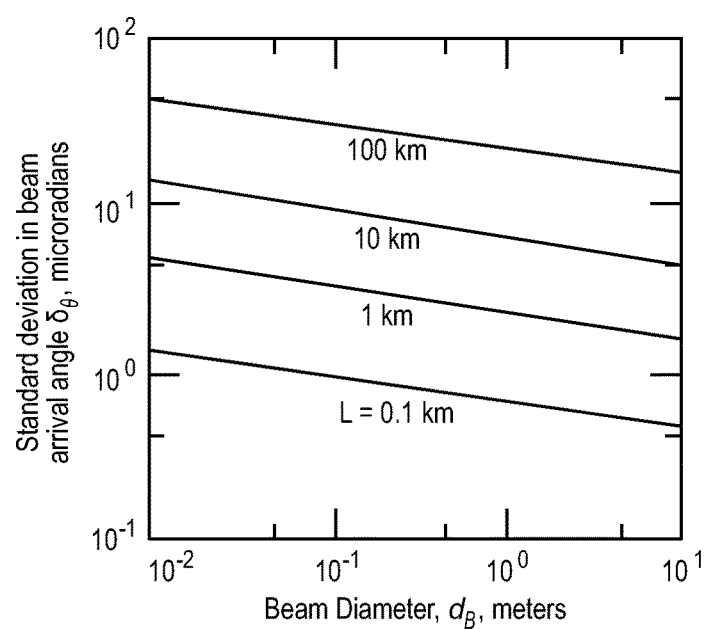
FIG. 4 is graph illustrating standard deviation in arrival angle due to reasonable atmospheric turbulence level as a function of beam diameter $d_B$ for different sizes of index of refraction fluctuation due to turbulence.

FIG. 4 illustrates standard deviation in arrival angle due to reasonable atmospheric turbulence level as a function of beam diameter $d_B$ for different sizes of index of refraction fluctuation due to turbulence [see W. K. Pratt, (1969), Laser Communications Systems, Wiley].

Basic Performance Estimates

Expressions for the background radiation power at the detector are derived from the standard radiometry equation found in many optics textbooks [see Pratt, W. K., Laser Communication Systems, Wiley (1969)]. These expressions are summarized in the table below.

| Source Relationship | Expression | Background Radiation Quantity |
|---|---|---|
| Any source | $P_B = \dfrac{\pi \tau_a \tau_r \lambda_i d_r^2}{4} W(\lambda)$ | Spectral irradiance |
| Spherical source of diameter, $d_s$, not filling receiver field of view | $P_B = \dfrac{\pi \tau_a \tau_r \lambda_i d_r^2}{16 R^2} W(\lambda)$ | Spectral radiant emittance |
| | $P_B = \dfrac{\pi^2 \tau_a \tau_r \lambda_i d_r^2}{16 R^2} N(\lambda)$ | Spectral radiance |
| | $P_B = \dfrac{\pi^2 \tau_a \tau_r \lambda_i d_r^2 h f_c}{16 R^2} Q(\lambda)$ | Photon spectral radiance |
| Extended source filling receiver field of view, $\theta_R$ | $P_B = \dfrac{\pi \tau_a \tau_r \lambda_i \theta_R^2 d_r^2}{4} W(\lambda)$ | Spectral radiant emittance |
| | $P_B = \dfrac{\pi^2 \tau_a \tau_r \lambda_i \theta_R^2 d_r^2}{4} N(\lambda)$ | Spectral radiance |
| | $P_B = \dfrac{\pi^2 \tau_a \tau_r \lambda_i \theta_R^2 d_r^2 h f_c}{4} Q(\lambda)$ | Photon spectral radiance, | where the parameters shown in the table are as follows:
$\tau_a$ atmospheric transmissivity
$\tau_r$ receiver transmissivity
$\lambda_i$ input filter bandwidth in wavelength units (X is wavelength)
$\theta_R$ receiver field-of-view angle
$d_s$ diameter of the background radiation source
$d_r$ diameter of the receiver
H spectral irradiance
N spectral radiance
W spectral radiant emittance in wavelength units
$P_B$ background radiation average power at the detector surface
R Range At 10 microns wavelength, the values of background due to sun, daytime sky, night-time sky, full moon, earth and brightest stars are as follows:

| | |
|---|---|
| Sun: | $H(\lambda) \sim 10^{-5}$ Watts per cm$^2$. |
| Daytime Sky: | $N(\lambda) \sim 5 \times 10^{-4}$ Watts per cm$^2$, micron, steradian. |
| Night-time Sky: | $N(\lambda) \sim 0.1 \times 10^{-10}$ Watts per cm$^2$, micron, steradian. |
| Full Moon: | $H(\lambda) \sim 10^{-10}$ Watts per cm$^2$, micron. |
| Earth: | $W(\lambda) \sim 3 \times 10^{-3}$ Watts per cm$^2$, micron. |
| Brightest Stars: | $H(\lambda) \sim 10^{-14}$ Watts per cm$^2$, micron. |

Based on these values, the background power at a pixel in our optical system may be calculated. For a pixel side being 10 microns, and the focal-length of the lens being set, as above, at 0.5 meters, the following background power levels at the detector pixel, under the background conditions may be calculated to be:

| | |
|---|---|
| Sun: | $\sim 1.3 \times 10^{-3}$ Watts. |
| Daytime Sky: | $\sim 8 \times 10^{-11}$ Watts. |
| Night-time Sky: | $\sim 1.6 \times 10^{-12}$ Watts. |
| Full Moon: | $\sim 1.3 \times 10^{-8}$ Watts. |
| Earth: | $\sim 4.7 \times 10^{-10}$ Watts. |
| Brightest Stars: | negligible. |

By applying the Responsivity (Amps/Watt) to this natural background noise power, the induced natural background noise current may be calculated and the signal to noise ratio may be estimated (neglecting atmospheric transmission for a worst case calculation). The signal to noise with no natural background noise, and for natural background noise due to daytime sky are estimated as shown in the table below for a nanoparticle plasmonic detector, a typical MCT detector, and a typical microbolometer detector, for responsivity (Resp) values as shown.

|  | SNR: No background | SNR: Daytime Sky Background |
|---|---|---|
| nanoparticle plasmonic (Resp=500) | ~$10^4$ | 0.63 |
| MCT (Resp=120) | ~40 | 0.57 |
| Microbolometer (Resp=500) | ~95 | 0.15 |

As can be seen, even though the nanoparticle plasmonic detector has extremely low noise compared to both the MCT and microbolometer detectors, the magnitude of the natural background daylight sky noise dominates the detector noise itself.

Detector Array Correlation Signal Processing for Passive CAT

As noted above, the passive system uses correlation techniques to reduce the effects of thermal background noise to allow for detection of CAT at a distance from the system of ≥10 km. The type of correlation techniques may depend on the number of detector arrays employed in the passive system. Returning to FIG. 1, if the detector array 110 comprises a single detector array, the processing electronics 130 may calculate a correlation value based on auto-correlation of the pixels of the single detector array. If the detector array 110 comprises a plurality of detector arrays, the processing electronics 130 may calculate a correlation value based on multi-correlation of corresponding pixels of the plurality of detector arrays. For example, if the detector array 110 comprises two detector arrays, such as the detector arrays 110a and 110b shown in FIG. 1, the processing electronics 130 may calculate a correlation value based on a cross-correlation of corresponding pixels of the two detector arrays.

An example of a correlation technique for the detector array 110 comprising two detector arrays is now described. Each of the detector arrays 110a and 110b are arranged to image an overlapping, though not identical region in space.

The correlation coefficient $\rho_{X,Y}$ between two random variables X and Y having standard deviations $\sigma_X$ and $\sigma_Y$ is defined as:

$$\rho_{X,Y} = \text{corr}(X, Y) = \frac{\text{cov}(X, Y)}{\sigma_X \sigma_Y}$$

where corr(X,Y) is the correlation function, nd cov(X,Y) is the covariance function.

For two detector matrix arrays A and B, the covariance of the elements in the m by n arrays A and B is defined as:

$$\text{cvar}(A, B) = \frac{1}{mn} \sum_{i=0}^{m-1} \sum_{j=0}^{n-1} [A_{i,j} - \text{mean}(A)][\overline{B_{i,j} - \text{mean}(B)}]$$

where $A_{i,j}$ and $B_{i,j}$ are the i, jth elements of the arrays A and B, respectively, and the bar indicates complex conjugation, and $$\text{mean}(A) = \frac{1}{mn} \sum_{i=0}^{m-1} \sum_{j=0}^{n-1} A_{i,j}$$

The correlation function of the two detector arrays can be calculated by the processing electronics 130 based on the above equation for the covariance of the elements.

For small array sizes, perhaps $100^2$ elements, the correlation value, Corr (A, B), rapidly computes a scalar between 0 (0%) and 1 (100%) as the correlation value; i.e., Pearson's r coefficient.

The processing electronics may then compare the value of the correlation value with a threshold value, which may be between 0.8 and 0.85 for example, and if the correlation value is above the threshold value, the processing electronics indicates that an event has occurred, where the event may be the existence of CAT.

The processing electronics may calculate the correlation coefficient many times per second with dedicated fast logic (>5 times per second dwell/integration time), to provide a continuous stream of correlation values that could be compared to a threshold level, above which a high probability of CAT signals is expected to have been the cause. For example, the processing electronics may calculate the correlation coefficient 1 to 10 times per second.

While a cross-correlation coefficient is calculated for two detector arrays, alternatively the auto-correlation coefficient may be calculated for a single detector array, or a triple-correlation coefficient may be calculated for a three detector array arrangement.

Correlation Performance Estimates for a Two Detector Array Passive CAT Scheme

Below is described a simulation for estimating the correlation performance for a two detector array arrangement. From the calculation above regarding signal to noise ratios in the presence of daytime sky, the RMS noise level is taken to be about 0.5. In this simulation there are two sets of 10×10 matrix elements, corresponding to a 10×10 arrangement of pixels in two detector arrays, with numbers for the noise value taken from a random distribution of range 0 to 1.

In this simulation, the peak signal levels, representing CAT fluctuations of around 2° C. will take values from 0.5 (same as the rms noise) to 2, and will only populate 20% of the sensor array elements, to which the noise will also be added.

As a simulation, for the 20% of elements, the randomly populated signal matrix is taken as is shown in FIG. 5, where L is the signal level for each pixel having the signal level L, while the remaining 80% of the elements have a 0 signal. This simulation corresponds to the situation where a "turbulent cluster" is mostly imaged in the top left hand corner of the signal matrix. The signal matrix for the second detector array has similar but not the same spatial characteristics as that for the first detector array.

For the noise backgrounds, two matrices, one for each of the signal matrices, are constructed with random numbers as described, where one of the noise matrices, the one of the first detector array, is shown in FIG. 6.

Setting the signal level L at 1.0, the signal plus noise matrix has the typical form as shown in FIG. 7. The correlation value, Corr (A, B), may be determined based on the signal plus noise matrices of the two detector arrays according to the above equations.

The table below illustrates what happens to the correlation coefficient as the value of the signal level L of the 20% filled signal pixels is raised from an RMS noise value of 0.5 up to 2.0.

| L | Correlation value |
|---|---|
| 0.5 | 0.36 |
| 1.0 | 0.7 |
| 1.5 | 0.84 |
| 2.0 | 0.9 |
| 2.5 | 0.94 |
| 3.0 | 0.96 |
| 4.0 | 0.97 |

A correlation threshold value in the region of 0.8 to 0.85 allows for the beginning of detection of a fairly low and sparsely populated detector element against a similar level of RMS noise background.

Higher correlation values would be expected to be achieved for larger sizes, such as for 100×100 or 1000×1000, presuming the correlation values can be correlated in real time.

Mounted Optical System

Figure 8:
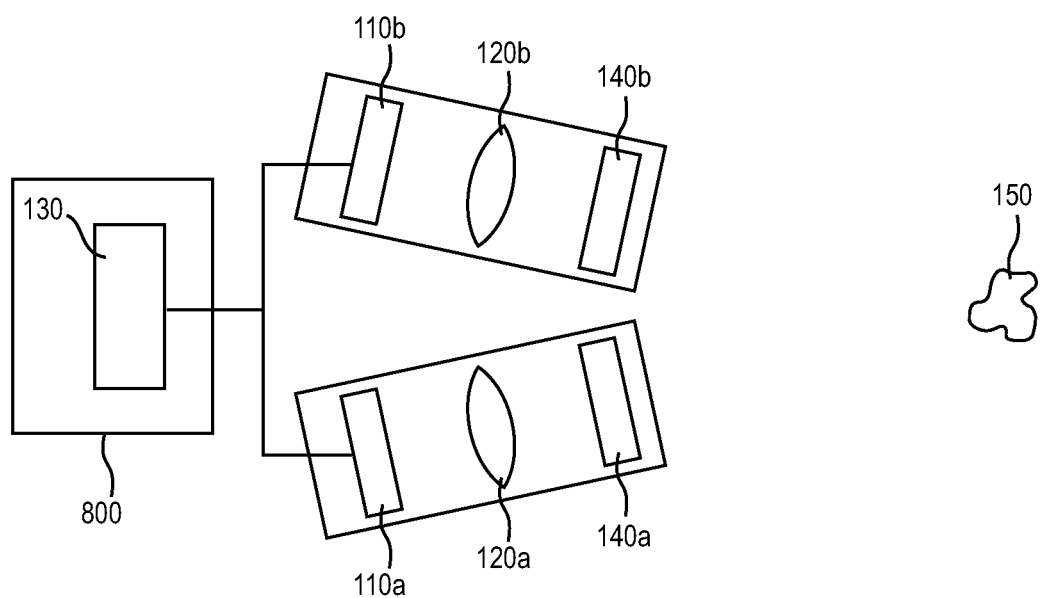
FIG. 8 is a schematic illustrating a system for detecting air turbulence including a passive thermal imaging system according to an embodiment of the invention.

As illustrated in FIG. 8, the above described thermal imaging system may be mounted in practice on an appropriate platform. FIG. 8 illustrates a system 800 for detecting air turbulence. The system 800 comprises a structure 810, and a passive thermal imaging system 100, such as that described with respect to FIG. 1, mounted on the structure 800. As can be seen in FIG. 8, the detector arrays 110a and 110b may be arranged in separated regions of the structure 810, and to image the same object 150.

The structure 800 may be a vehicle or a ground based platform. The vehicle may be an aircraft, a spacecraft, or an unmanned aerial vehicle (UAV), for example.

The embodiments of the invention has been described in detail with particular reference to preferred embodiments thereof, but it will be understood by those skilled in the art that variations and modifications can be effected within the spirit and scope of the invention.

What is claimed is:

1. A passive thermal imaging system, comprising:
a plurality of detector arrays, each of the detector arrays configured to detect thermal electromagnetic radiation (EMR) within a same band around a desired EMR wavelength, each of the detector arrays comprising a plurality of pixels;
imaging optics configured to receive thermal EMR within the band from an object, and to image the received thermal EMR from a same region of the object onto pixels of each of the plurality of detector arrays; and
processing electronics configured to receive a detected signal from each of the pixels of the plurality of detector arrays, to calculate a correlation value based on a multi-correlation of the received detected signals of corresponding pixels of different detector arrays of the plurality of detector arrays, the detected signals based on the thermal EMR from the object, and to compare the correlation value with a threshold correlation value to determine that a detection event has occurred in response to the correlation value exceeding the threshold correlation value being equal to or between 0.8 and 0.85, the processing electronics are configured to calculate the correlation value based on a covariance of the received detected signals of the corresponding pixels of the different detector arrays, the detection event corresponding to a size of a temperature fluctuation of the object, wherein the imaging optics are configured to receive thermal EMR from a region of the atmosphere as the object, and where the detection event is clear air turbulence exhibiting thermal fluctuations of air at a distance from the system ≥10 kilometers.

2. The passive thermal imaging system of claim 1, wherein the plurality of detector arrays comprises two detector arrays, and the processing electronics is configured to calculate a correlation value based on cross-correlation of corresponding pixels of the plurality of detector arrays.

3. The passive thermal imaging system of claim 1, wherein the plurality of detector arrays comprises three detector arrays, and the processing electronics is configured to calculate a correlation value based on triple-correlation of corresponding pixels of the plurality of detector arrays.

4. The passive thermal imaging system of claim 1, wherein the plurality of detector arrays comprise at least one of a nanoparticle plasmonic detector array, a mercury cadmium telluride detection array, or a bolometer detector array.

5. The passive thermal imaging system of claim 4, wherein the plurality of detector arrays comprise a nanoparticle plasmonic detector array.

6. The passive thermal imaging system of claim 1, wherein
the processing electronics is configured to time integrate or spatially integrate the detected signals at a rate of 1 to 10 times per second.

7. The passive thermal imaging system of claim 1, wherein the imaging optics comprises an imaging lens.

8. The passive thermal imaging system of claim 7, further comprising:
a bandpass filter which filters the received thermal EMR from the object within a EMR wavelength range.

9. A system for detecting clear air turbulence, comprising:
a structure having the passive thermal imaging system of claim 1 mounted thereon.

10. The system of claim 9, wherein the structure is one of a vehicle or a ground-based platform.

11. The system of claim 10, wherein the structure is a vehicle, which is one of an aircraft, a spacecraft, or an unmanned aerial vehicle.

12. The passive thermal imaging system of claim 1, further comprising:
a bandpass filter which filters the received thermal EMR from the object within a EMR wavelength range of 10 microns±2 microns.

* * * * *